INVENTOR
ROBERT A. TIDBALL

BY *Seidel & Gonda*

ATTORNEYS.

March 5, 1968

R. A. TIDBALL 3,372,096

HIGH PURITY WATER FLASH EVAPORATOR WITH SERIES STAGES
FOR REDISTILLATION OF DISTILLATE

Filed July 5, 1966

INVENTOR
ROBERT A. TIDBALL

BY

ATTORNEYS.

March 5, 1968 R. A. TIDBALL 3,372,096
HIGH PURITY WATER FLASH EVAPORATOR WITH SERIES STAGES
FOR REDISTILLATION OF DISTILLATE
Filed July 5, 1966 3 Sheets-Sheet 3
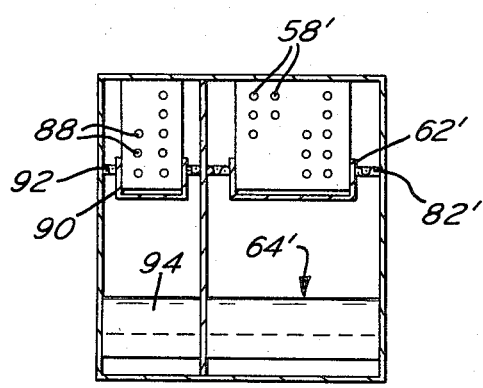
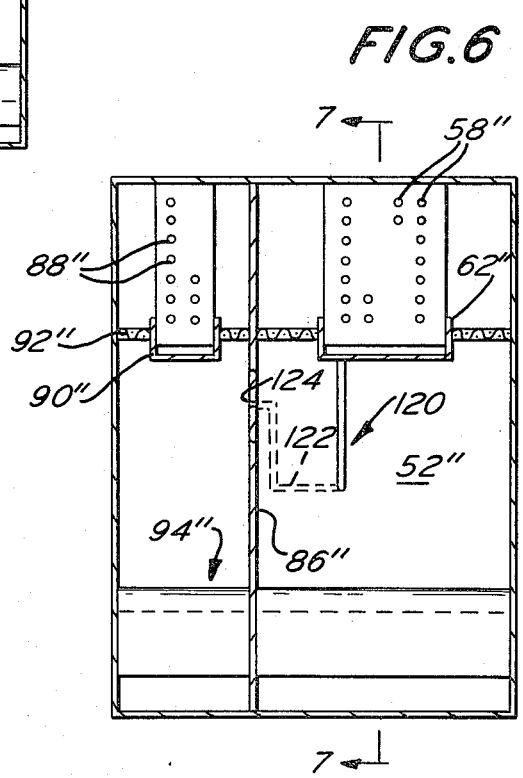
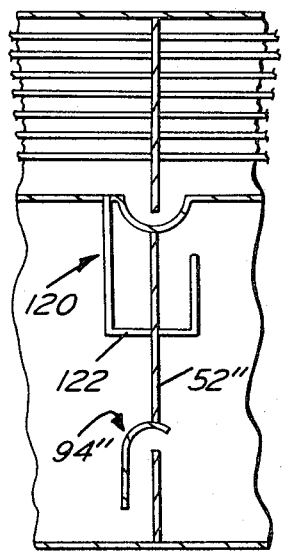
INVENTOR
ROBERT A. TIDBALL
BY *Seidel & Gonda*
ATTORNEYS.

United States Patent Office 3,372,096
Patented Mar. 5, 1968

3,372,096
HIGH PURITY WATER FLASH EVAPORATOR
WITH SERIES STAGES FOR REDISTILLA-
TION OF DISTILLATE
Robert A. Tidball, Swarthmore, Pa., assignor to Baldwin-
Lima-Hamilton Corporation, Philadelphia, Pa., a cor-
poration of Delaware
Filed July 5, 1966, Ser. No. 562,715
5 Claims. (Cl. 202—173)

ABSTRACT OF THE DISCLOSURE

A flash evaporator wherein sea water is distilled in a first series of stages, and the resulting distillate is re-distilled in a second series of stages to provide a high purity distillate.

This invention relates to an apparatus and method for obtaining high purity water from multi-stage distilling plants. More particularly, this invention relates to apparatus and a method whereby distillates of more than one degree of purity may be obtained.

It is well known to distill saline or waters having other forms of turbidity by means of flash evaporation to obtain relatively pure distillates. The purity of such distillates has been limited in the past by economical factors to about 1 to 100 p.p.m. Although suitable for most uses, the conventional distillate is nonetheless too high in impurities for use as make-up in modern boilers, or in nuclear power plants.

Thus, even the relatively low degree of impurity characteristic of the distillate of conventional evaporators may lead to the formation of unwanted scale on the critical heat transfer surfaces of modern high temperature boilers. Also, when subjected to certain types of radiation, such as those encountered in the primary and secondary loops of a nuclear power plant, such particles may become dangerously radioactive.

Accordingly, a real need exists for distillates of very high purity (approximately 10–25 p.p.b. total dissolved solids) for specialized applications.

The present invention contemplates an apparatus for obtaining high purity distillates, as well as a novel series of steps whereby raw distilland is first subjected to primary distillation in a multi-stage evaporator, and the resulting distillate reevaporated to form a highly purified product. The present invention contemplates apparatus in two embodiments for accomplishing the desired result.

With reference to the apparatus, where large amounts of highly purified distillate are required, some or all of the distillate of an evaporator having a first series of stages may be inserted into a second series of evaporation stages and re-distilled. The re-distilled portion emerges from the stages of the second series as the desired high purity product.

Should smaller amounts of high purity product be desired, it is contemplated that primary distillate be drawn from any selected stage or stages of the evaporator, and re-distilled in the evaporation stages of a second series. It should be understood that the amount of high purity product is a function of the amount of primary distillate subjected to re-distillation, and of the number of stages in the re-distillation apparatus.

For the purpose of illustrating the invention, there are shown in the drawings forms which are presently preferred; it being understood, however, that this invention is not limited to the precise arrangements and instrumentalities shown.

FIGURE 5 is a cross-sectional view taken along the line 5—5 in FIGURE 3.

FIGURE 6 is a view similar to FIGURE 5, but illustrating another embodiment.

FIGURE 7 is a partial cross-sectional elevational view along the line 7—7 in FIGURE 6.

Figures 1, 2:
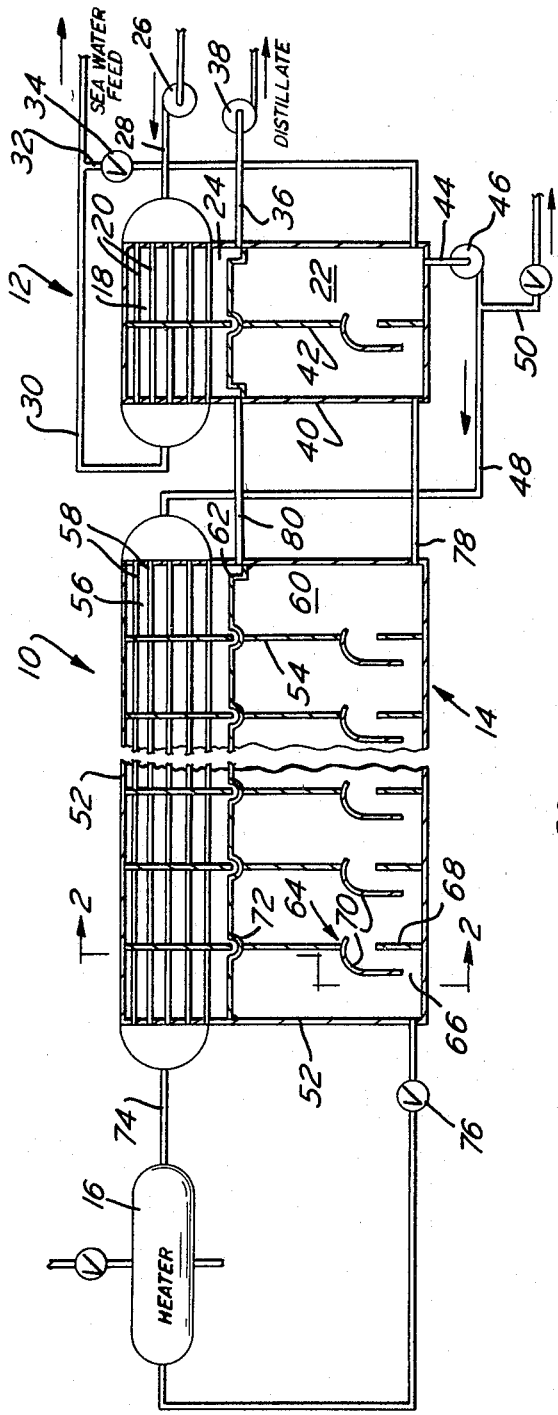
FIGURE 1 is a cross-sectional elevation view of a multi-stage flash evaporator of more or less conventional construction.
FIGURE 2 is a cross-sectional view taken along the line 2—2 in FIGURE 1.

A complete understanding of the present invention requires some understanding of conventional practice in the art of large scale sea water conversion. Accordingly, there is shown in FIGURE 1 a multi-stage flash evaporator 10 of more or less typical construction. The flash evaporator 10 includes a pair of heat rejection stages 12 and a series of heat recovery stages 14. It is understood that the number of stages may be varied.

Each individual heat rejection stage 12 includes a condenser section 18, which contains condenser tubes 20. Also, each rejection stage includes an evaporator section 22 and a condensate collection pan 24. A heater 16, to be more fully explained later, is also provided.

Referring now to the extreme righthand side of the figure, distilland, usually sea water is drawn from a source, not shown, by a pump 26. The pump 26 is in fluid communication with a conduit 28. The conduit 28 in turn is in fluid communication with one end of the condenser tubes 20. A further conduit 30 is in fluid communication with the other end of the condenser tubes 20.

A branch conduit 32, which includes a valve 34, is in communication at one of its ends with the conduit 30. The other end of the conduit 32 communicates with a bottom portion of the evaporator section 22.

A conduit 36, through which distilled product may flow, is in communication at its respective ends with the condensate pan 24 and a product pump 38.

As seen in FIGURE 1, the heat rejection stages 12 comprise an outer shell 40, and an internal wall or partition 42 to separate the individual stages. The heat rejection stage appearing on the right may hereinafter be referred to as the last heat rejection stage.

A conduit 44 is in fluid communication with the bottom of the last heat rejection stage. A recycle pump 46 receives the conduit 44. Discharge from the recycle pump 46 is to a conduit 48. A blowdown line 50, which contains a control valve, not numbered, branches off the conduit 48.

Referring now to the heat recovery stages 14, it is seen that such stages are constructed for the purpose of illustration in a manner not unlike the above-described heat rejection stages. Thus, an outer shell 52 is divided by spaced walls or partitions 54 into a series of stages. Each of the stages includes a condenser section 56, including condenser tubes 58. In addition, each stage includes an evaporator section 60. A condensate pan 62 underlies the condenser tubes 58.

The walls or partitions 54 of the heat recovery stages 14 and the corresponding partitions 42 of the heat rejection stages 12 contain pressure reducing and sealing devices whereby a differential pressure between successive stages is produced and maintained. Such devices, designated generally by the reference numeral 64 comprise an orifice 66, a weir 68 and a deflector 70. Loop seals 72 in the condensate pans 62 and 24 provide pressure seals between adjacent condenser sections 56.

The conduit 48 is in fluid communication with one end of the condenser tubes 58. The tubes 58, it should be understood, run the entire length of the shell 52. Similarly, the tubes 20 run the entire length of the shell 40.

A conduit 74 is in fluid communication with the other end of the condenser tubes 58. The conduit 74 passes through the aforementioned heater 16, which may take the form of an indirect heat exchanger. A valve 76 is provided in conduit 74 for regulation of flow therethrough. The conduit 74 is in fluid communication with one of the heat recovery stages, which may henceforth be referred to as the first heat recovery stage.

A conduit 78 couples a lower portion of the evaporator section of the last heat recovery stage with a lower portion of the evaporator section of the first heat rejection stage. Also, a conduit 80 provides for fluid communication between the condensate pan 62 at the last heat recovery stage and the condensate pan 24 at the first heat rejection stage.

In view of the foregoing, the operation of the evaporator is evident. Thus, raw distilland is drawn into the evaportor by means of the pump 26, and flows through the conduit 28, the condenser tubes 20 and the conduit 30. A portion of the liquid is discarded, and the remainder permitted to flow through the conduit 32 to the evaporator section 22. The valve 34 serves to regulate the volume of the flow through the conduit 32.

Fluid from the conduit 32 joins fluid in the last flash chamber 22 of the heat rejection stages 12. The mixture may then flow through the conduit 44, and be pumped by the pump 46 through the conduit 48. A portion may be discharged through the line 50. The remaining portion passes through the condenser tubes 58, the conduit 74 and the heater 16. From the heater 16, it passes through the valve 76 and into the evaporator section of the first heat recovery stage. The pressure in the first heat recovery stage is maintained at a level lower than the saturation pressure corresponding to the temperature of the mixture as it enters the stage.

Accordingly, upon entering the first heat recovery stage, a portion of the fluid "flashes" to vapor. Such vapor rises toward the condenser section 56.

Referring now to FIGURE 2, the vapors, on entering the condenser section, pass through mist eliminators 82 disposed on opposite sides of the condensate pan 62. The mist eliminators 82 serve to remove droplets of entrained fluid from the vapor. Thus, in the ideal case, only vapor comes in contact with the condenser tubes 58.

It should now be apparent that the fluid flowing in the condenser tubes 58 is of lower temperature than the fluid in the evaporator section 60, and accordingly, serves as a condensing medium therefor. Condensate falls to the pan 62.

The distilland passes through the pressure reducing and sealing device 64 to the next stage. The distilland passes through the orifice 66, rises upwardly between the weir 68 and the deflector 70, and is directed into the next stage by the curved portion of the deflector 70. The resulting reduction in pressure results in further flashing of a portion of the distilland.

In a like manner, said distilland passes through the heat recovery stages, the conduit 78 and the heat rejection stages. The distilland ultimately reaches the last heat rejection stage in highly concentrated form, and is mixed with make-up fluid from the conduit 32.

As the distilland is passing through the respective stages in the aforementioned manner, the distillate likewise flows through successive heat recovery stages, the conduit 80 and the respective heat rejection stages. Loop seals 72 provide pressure seals between adjacent stages. Condensate is ultimately drawn off through the conduit 36 by means of pump 38. As is apparent, each successive stage adds its distillate to the distillate stream.

Figure 3:
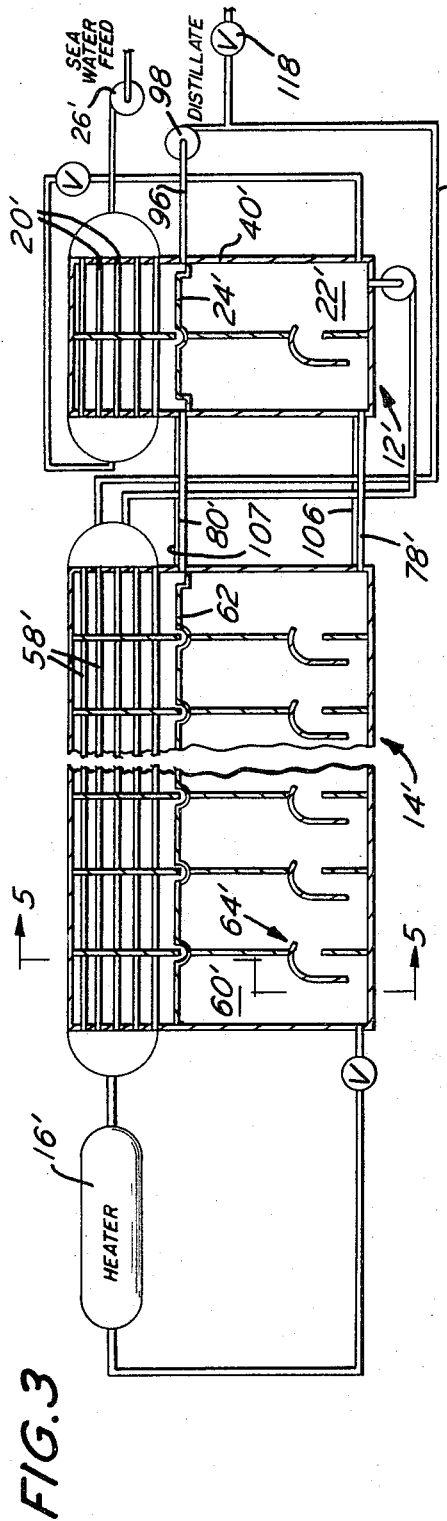
FIGURE 3 is a cross-sectional elevation view of a multi-stage flash evaporator in accordance with the present invention.
Figure 4:
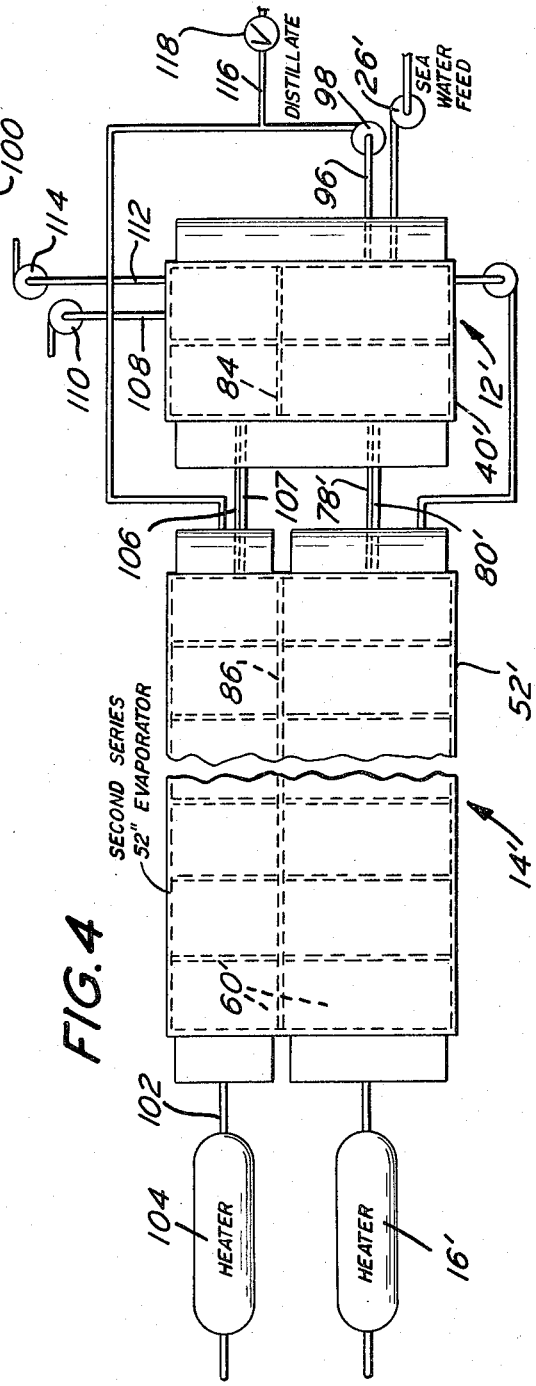
FIGURE 4 is a top plan view of the evaporator of FIGURE 3.

Referring now to FIGURES 3 and 4, there is seen a modified form of a multi-stage flash evaporator, constructed in accordance with the present invention. Various elements of the evaporator of FIGURE 3 correspond to those of the conventional apparatus previously described. Accordingly, corresponding elements are provided with corresponding primed numerals.

Thus, fluid to be treated is drawn from a source by the pump 26', and first passes through condenser tubes 20' of the heat rejection stages. Fluid then takes a path not unlike that previously described. Thus, the fluid passes through condenser tube 58' of heat recovery stages 14' and a heater 16', then through successive evaporator sections 60' of the individual heat recovery stages, then through a conduit 78', and finally through the evaporator sections 22' of the heat rejection stages 12'.

Referring now to FIGURE 4, there are seen the novel features of the present apparatus whereby high purity distillate is obtained. The outer shell 40' of the heat rejection stages 12' is divided internally by a longitudinally disposed wall 84. Also, the shell 52' of the heat recovery stages 14' is divided internally by a longitudinally disposed wall 86. Accordingly, it is seen that the heat recovery and heat rejection stages illustrated in FIGURES 3 and 4 define parallel series of stages. For the purpose of illustration, and hereinafter, the series of stages appearing at the bottom of FIGURE 4 may be referred to as a first series of stages, and the series of stages at the top of FIGURE 4 may be referred to as a second series of stages. As seen in FIGURE 5, the first series of stages appears at the right of the figure, and the second series appears at the left. Thus, the heretofore-mentioned condenser tubes 58' are associated with the first series of stages. Also, a condensate pan 62', pressure reducing and sealing device 64' and mist eliminators 82' are associated with the first series of stages. Condenser tubes 88, a condensate pan 90 and mist eliminator 92 are associated with the second series of stages. The individual stages of the second series are separated by a pressure reduction device 94 similar to the pressure reduction device 64'.

Referring once again to FIGURES 3 and 4, a conduit 96 extends from the condensate pan 24' at the last heat rejection stage of the first series of stages to a pump 98. The discharge side of the pump 98 is in fluid communication with a conduit 100, which in turn communicates with the condenser tubes of the second series of stages. The condenser tubes are in fluid communication with a conduit 102, best seen in FIGURE 4, which is directed through an indirect heater 104. The conduit 102, at its opposite end, enters the evaporator section 60' of the first heat recovery stage of the second series. A conduit 106 connects the evaporator section 60' of the last heat recovery stage of the second series of stages with the evaporator section 22' of the first heat rejection stage. A conduit 107 joins the distillate pans of the heat recovery and heat rejection stages of the second series. Conduit 108 and pump 110 may be provided to remove the highly purified distillate from the condensate pan 90 in the last heat rejection stage. A conduit 112 and pump 114 are provided in communication with the evaporator section of the last heat rejection stage for removal of the unevaporated primary distillate.

Those skilled in the art will appreciate that the apparatus described above may be altered somewhat without departing from the novel attributes of the invention. Thus, it will be appreciated that the number of stages in the second series will be determined by the amount of high purity distillate required for any given application. Accordingly, where the yield so obtained is sufficinet, and thermodynamic criteria of overall plant design do not render it impractical, the redistillate may be drawn off at other than the last stage of the second series. For example, the re-distillate may be drawn off at the last heat recovery stage.

Also, it should be apparent that a conduit 116 and valve 118 may be provided in fluid communication with the condensate pan 24' at the last heat rejection stage for drawing off any desired portion of the primary distillate for use where the purity of such distillate is adequate.

Referring now to FIGURES 6 and 7, there is seen a modified form of apparatus incorporating the present inventive concept. Numerous elements of the modified form are identical to those previously described. Accordingly, such elements need not be described in detail, and are designated by double-primed numerals.

In FIGURE 6, representative stages of the first and second series of stages are shown. Thus, there is seen in FIGURE 6 a wall 52″ defining the end of the stage, and a longitudinal wall 86″ separating the respective series.

As is perhaps best seen in FIGURE 7, a conduit 120, which includes a loop seal 122 and a pressure reducing orifice 124 is in fluid communication at one end with the condensate pan 62″ of the first series stage. The conduit 120 passes through the wall 52″ into the next lower stage, and then through the longitudinal wall 86″ into communication with a stage of the second series. It should be understood that the stage of the second series is at a pressure below the saturation pressure of the distillate entering the conduit 120.

In view of the foregoing, it is believed that the operation of the embodiment shown in FIGURES 6 and 7 is evident. Thus, the fluid flowing through conduit 120 and the pressure reducing device 124 into the stage of the second series flashes to vapor. The vapor rises through mist eliminators 92″ into contact with the condenser tubes 88″, whereupon it is condensed and falls to the condensate pan 90″. Portions not vaporized fall to the floor of the stage, and pass through the pressure reduction device 94″, whereupon a further portion flashes. Thus, vapors from the flashing of fluid entering the next stage through a conduit corresponding to the conduit 120 mixes with the vapors from the unflashed portion flowing into the stage through the pressure reduction device 94″.

Accordingly, it is seen that a stream of re-distillate is established in the condensate pan 90″, and a stream of unflashed distillate disposed through the evaporator sections of the second series.

With the embodiment of FIGURES 6 and 7, a portion of the recycle, that is the liquid flowing in the condenser tube 58″, may be diverted through the condensate tube 88″ of the second series stages. Alternatively, dependent upon thermodynamic considerations, fluid from other sources may be so used.

The number of stages constructed in accordance with FIGURES 6 and 7 is dependent upon the amount of high purity water desired. Since the requirement for high purity makeup in modern boiler cycles is low, for such an application only a portion of the total stages need be so constructed. If a large portion of the total product must be high purity, the embodiment of FIGURES 3 and 4 may be advantageous.

The present invention also encompasses a method whereby high purity water may be obtained by flash evaporation. Thus, in its broadest sense, the present invention may be defined in terms of a method for obtaining high purity distillate, wherein a liquid such as sea water is vaporized in a multi-stage operation; the vapors are condensed and the condensate collected as primary distillate; at least a portion of the primary disillate is drawn off out of fluid communication with the vapors and subjected to a second vaporization in the multi-stage operation, and the vapors of the second evaporization are condensed and collected as high purity redistillate.

The present invention constitutes a clear advance in the art, since it permits a single plant to produce distillate of differing degrees of purity. Moreover, when practiced in accordance with the embodiment of FIGURES 6 and 7, the high purity distillate is obtained with no added energy input. Thus, the present invention satisfies the need for high purity makeup water for boilers or the like in an efficient and relatively inexpensive manner.

The present invention may be embodied in other specific forms without departing from the spirit or essential attributes thereof and, accordingly, reference should be made to the appended claims, rather than to the foregoing specification as indicating the scope of the invention.

I claim:

1. A flash evaporator comprising a first series of evaporation stages of successively reduced pressure and temperature, each stage including a flash chamber, condenser means, and distillate collecting means, a distillate evaporator, said distillate evaporator comprising a second series of evaporation stages of successively reduced pressure and temperature, each of said stages of said second series comprising a distillate flash chamber, condenser means, and re-distilled distillate collecting means, a shell housing said first and second series of stages, a wall disposed longitudinally of said shell and separating said series of stages so that said respective series of stages are disposed in parallel relation, at least one passage in fluid communication with the distillate collecting means of a stage of said first series and with the flash chamber of a stage of said second series so that at least a portion of the distillate in the distillate collecting means of said stage of said first series flows through said passage to the flash chamber of said stage of said second series, whereby said portion is re-distilled in said second series, said passage being the only means of fluid communication between said first and said second series of stages.

2. A flash evaporator in accordance with claim 1 having a single passage, said passage being in fluid communication with the distillate collecting means of the stage of said first series having the lowest temperautre and pressure and the flash chamber of the stage of said second series having the highest temperature and pressure.

3. A flash evaporator in accordance with claim 1 having a single passage, said passage being in fluid communication with the distillate collecting means of the stage of said first series having the lowest temperature and pressure and the flash chamber of the stage of said second series having the highest temperature and pressure, a portion of said passage extending through said second series of stages out of fluid communication therewith to define the condenser means of said second series, and a heater in communication with said passage, whereby said distillate in said passage is heated before entering said flash chamber of said stage of said second series.

4. A flash evaporator in accordance with claim 1 having a plurality of said passages, each passage being in fluid communication with the distillate collecting means of a stage of said first series and the flash chamber of the stage of said second series having lower temperature and pressure than said stage of said first series.

5. A flash evaporator in accordance with claim 4 including pressure sealing means in said passages for maintaining the pressure difference between said respective stages, and pressure reducing means in said passages.

References Cited

UNITED STATES PATENTS

| 2,979,443 | 4/1961 | Frankel | 202—173 |
| 3,119,752 | 1/1964 | Checkovich | 203—11 |
| 3,146,177 | 8/1964 | Chalmers et al. | 202—160 |
| 3,174,914 | 3/1965 | Worthen et al. | 202—173 |
| 3,192,131 | 6/1965 | Loebel et al. | 202—173 |
| 3,312,601 | 4/1967 | Wilson et al. | 203—11 |
| 3,320,137 | 5/1967 | Jebens et al. | 202—173 |
| 2,837,469 | 6/1958 | Mohn | 203—82 X |
| 3,288,685 | 11/1966 | Kemfer et al. | 203—11 |

NORMAN YUDKOFF, *Primary Examiner.*

F. E. DRUMMOND, *Assistant Examiner.*